United States Patent [19]

Shoda et al.

[11] 3,891,835

[45] June 24, 1975

[54] CONTROL SYSTEM FOR A BALANCE CORRECTING MACHINE

[75] Inventors: Hiroshi Shoda; Mikio Araki, both of Kaga, Japan

[73] Assignee: Kabushiki Kaisha Komatsu Seisakusho, Tokyo, Japan

[22] Filed: May 26, 1972

[21] Appl. No.: 257,373

[30] Foreign Application Priority Data
May 26, 1971 Japan..........................46-35513

[52] U.S. Cl............ 235/151.11; 318/652; 318/696; 318/39; 73/66; 408/2
[51] Int. Cl. ............................................. B23c 3/00
[58] Field of Search ........... 318/566, 652, 656, 696, 318/39; 235/151, 11; 73/480, 482, 65, 66; 408/2

[56] References Cited
UNITED STATES PATENTS

| | | | |
|---|---|---|---|
| 2,690,702 | 10/1954 | Romans et al. | 408/2 |
| 3,021,464 | 2/1962 | Philip | 318/652 X |
| 3,529,510 | 9/1970 | Albright | 408/2 |

*Primary Examiner*—Eugene G. Botz
*Attorney, Agent, or Firm*—Armstrong, Nikaido & Wegner

[57] ABSTRACT

A control system for a balance correcting machine having a cutter slide with a cutter mounted on a cutter spindle for machining a workpiece, such as a connecting rod for a diesel engine, in which an unbalance detecting mechanism provided in the cutter slide detects the unbalance of a workpiece when coming into contact with the surface to be corrected of the workpiece as the cutter slide advances, and a comparator compares this detected unbalance with the predetermined value of the unbalance provided by a balance measuring instrument and produces a control signal for controlling the cutter slide to determine the accurate correcting position.

5 Claims, 11 Drawing Figures

"Quantity of feeding"– unbalance relationship

Output–travel relationship of differential transformer

PATENTED JUN 24 1975

3,891,835

SHEET 3

CONTROL SYSTEM FOR A BALANCE CORRECTING MACHINE

BACKGROUND OF THE INVENTION

This invention relates to a balance correcting machine, more particularly to a control system for a balance correcting machine in which an amount to be corrected is determined with a workpiece as a reference.

When the static unbalance of a workpiece, e.g., a connecting rod for a diesel engine, is corrected by a balance correcting machine machining the workpiece, the reference point has been heretofore set in the machine. The amount of the workpiece to be corrected has been, accordingly, predetermined on the basis of this reference point set in the machine. However, this method heretofore used has the disadvantage in that a high correcting accuracy cannot be obtained if the accuracy of the workpiece in the preceding process is not high, since this accuracy has a direct influence on the accuracy of the balance correcting machine.

SUMMARY OF THE INVENTION

This invention contemplates to eliminate the aforementioned disadvantage of the conventional balance correcting machine, and to provide a novel and improved control system for a balance correcting machine.

It is, therefore, an object of the present invention to provide a control system for a balance correcting machine in which the reference point is set in the workpiece in order to determine the amount of a workpiece to be corrected.

It is another object of the present invention to provide a control system for a balance correcting machine which may correct the static unbalance of the workpiece with high accuracy and ease.

Briefly, in accordance with an embodiment of the present invention, the foregoing and other objects are attained by a control system for a balance correcting machine having a laterally advanceable cutter slide with a cutter mounted on a cutter spindle for machining a workpiece, comprising first means associated with the cutter slide for producing a first output signal when coming into contact with the to-be-machined surface of the workpiece as the cutter slide advances, said first output signal being indicative of the position of the cutter slide relative to said surface, second means for providing a second output signal indicative of the predetermined value of the unbalance of the workpiece prior to machining, third means for comparing the first output signal with the second output signal to produce a control signal, and fourth means for controlling the cutter slide in accordance with the control signal to determine the proper correcting position of the cutter for machining said workpiece to the desired balance.

BRIEF DESCRIPTION OF THE DRAWINGS

A more complete appreciation of the present invention will be readily obtained as the same becomes better understood by reference to the following detailed description when taken in conjunction with the accompanying drawings, wherein.

DETAILED DESCRIPTION oF THE PREFERRED EMBODIMENT

Figure 1:
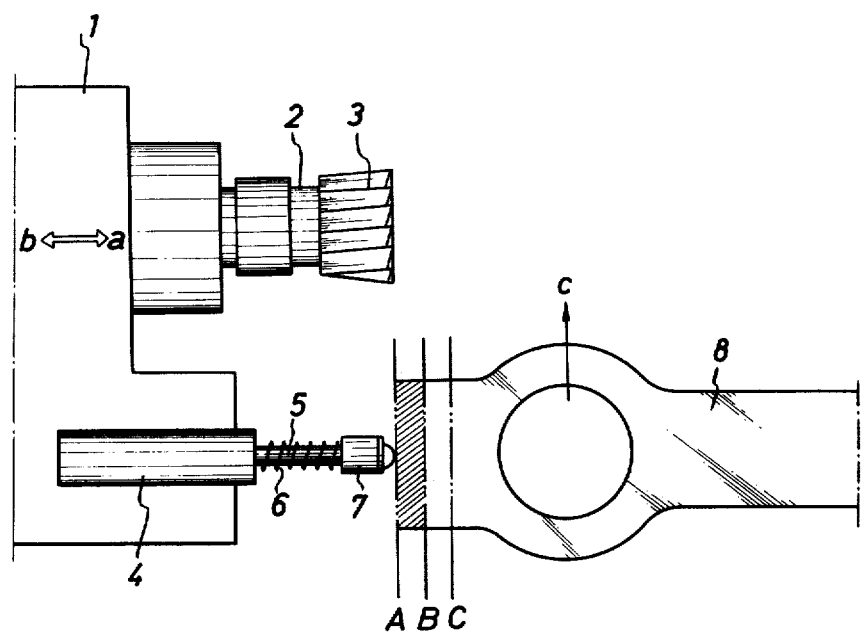
FIG. 1 is a schematic plan view of the unbalance detecting portion of the control system for the balance correcting machine associated with a sectioned workpiece according to one embodiment of the present invention.

Reference is now made to the drawings, wherein like reference numerals designate identical, or corresponding parts throughout the views.

In FIG. 1, reference numeral 1 illustrates cutter slide 1 of a machine tool (not shown) which can slide in the directions as indicated with arrows a and b. Cutter slide 1 is provided at the side thereof with spindle 2 which has cutter 3 at its leading end. Cutter 3 by rotation is adapted to shear workpiece 8, discussed below, when in contact therewith.

Cutter slide 1 is also provided with unbalance detecting mechanism 4 having a differential transformer (see FIG. 3), ahead of cutter 3 in relation to the travel path of workpiece 8. The actuating part of the differential transformer is connected to connecting rod 5 projecting in parallel with spindle 2 from the side of cutter slide 1. Connecting rod 5 is provided at its leading edge with detecting head 7 which is at all times biased in the projecting direction by the action of spring 6.

Reference numeral 8 illustrates a workpiece fixed on a table (not shown) movable in the direction of arrow c. Position A shows the size of the workpiece before shearing or correction, position B shows the ultimate corrected size of the workpiece, and position C shows a correction limit corresponding to a preset stroke end of said cutter 3 such as obtained via a limit position switch.

Figure 1A:
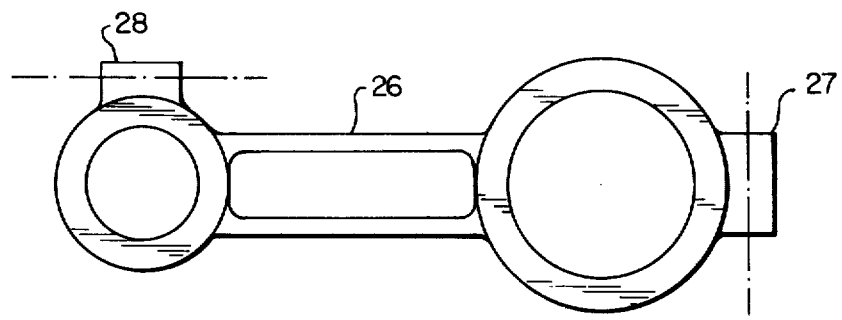
FIG. 1a illustrates in greater detail the representative workpiece shown in section in FIG. 1.

For a better understanding of the invention, an example of a workpiece to be corrected or machined is shown in FIG. 1a. This workpiece is connecting rod 26 for a diesel engine having correcting allowance portions 27 and 28, each exhibiting a constant cross section through the overall length thereof. Portions 27 and 28 are provided to permit selective removal of portions thereof in order to yield a connecting rod having desired balance for diesel operation.

Figure 3:
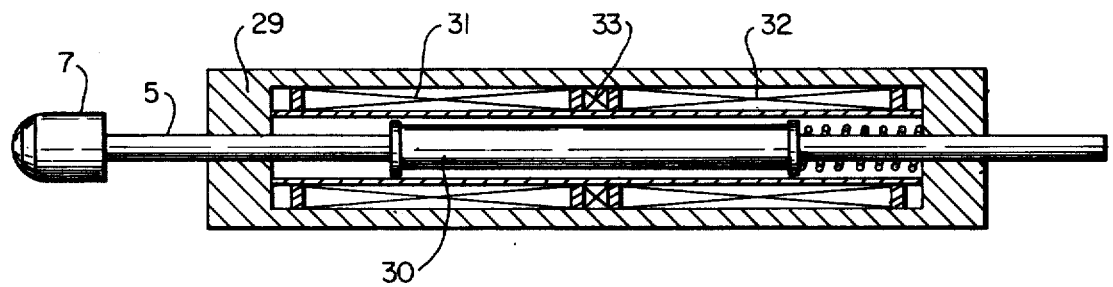
FIG. 3 is a cross-section of a differential transformer for use in the unbalance detecting portion of the embodiment of FIG. 1.

Greater details regarding the differential transformer of the unbalance detecting mechanism are depicted in FIG. 3. At the outset, it should be noted that this embodiment has been slightly modified for illustrative purposes from that of FIG. 1 by disposing the spring at the opposite end of connecting rod 5 from detecting head 7. Briefly, differential transformer 29 includes actuating part 30 made of magnetic material and movably associated with connecting rod 5. Associated therewith are secondary windings 31 and 32 and primary winding 33 which cooperatively produce and vary the electromotive force produced by differential transformer 29. This, as well as any other suitable differential transformer known in the art, may be employed in the unbalance detecting mechanism of the present invention.

Figure 5A:
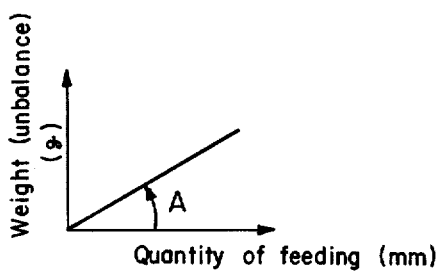
FIGS. 5a and 5b are graphs representatively depicting the relationship between the quantity of feeding and the unbalance, and the relationship between the travel of the differential transformer and its electrical output, respectively.
Figure 5B:
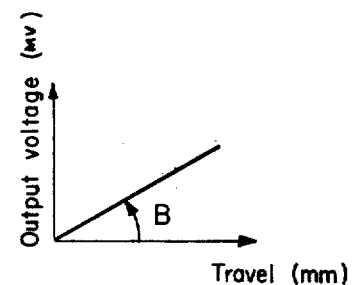

Returning to FIG. 1, the differential transformer in unbalance detecting mechanism 4 is preset so that the generated electromotive force is zero when the leading end of detecting head 7 is flush with that of cutter 3. The characteristics of the gradient of the output of the differential transformer are also adjusted so that the relationship between the travel of cutter 3 and the unbalance of workpiece 8 (i.e., the weight of that portion workpiece 8 encompassed by the travel of cutter 3) coincides with the relationship between the travel and the output of said differential transformer. In other words, angle A and angle B of FIGS. 5a and 5b, respectively, should be identical. This may be obtained by appropriately constructing the differential transformer or by including an output voltage regulator for modifying the output of the differential transformer, as will be discussed hereinafter.

Figure 4:
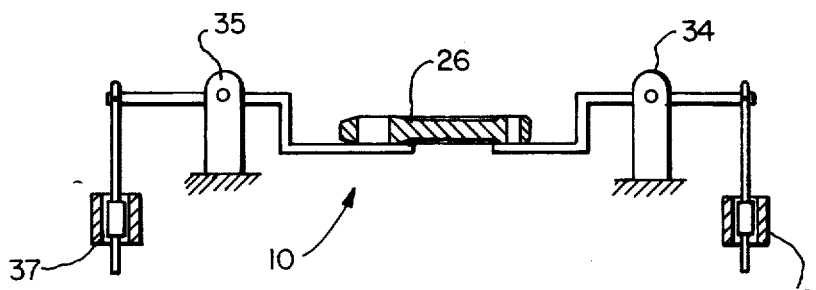
FIG. 4 schematically illustrates a balance measuring instrument for use in the control system of FIG. 2 according to an embodiment of the invention.
Figure 2:
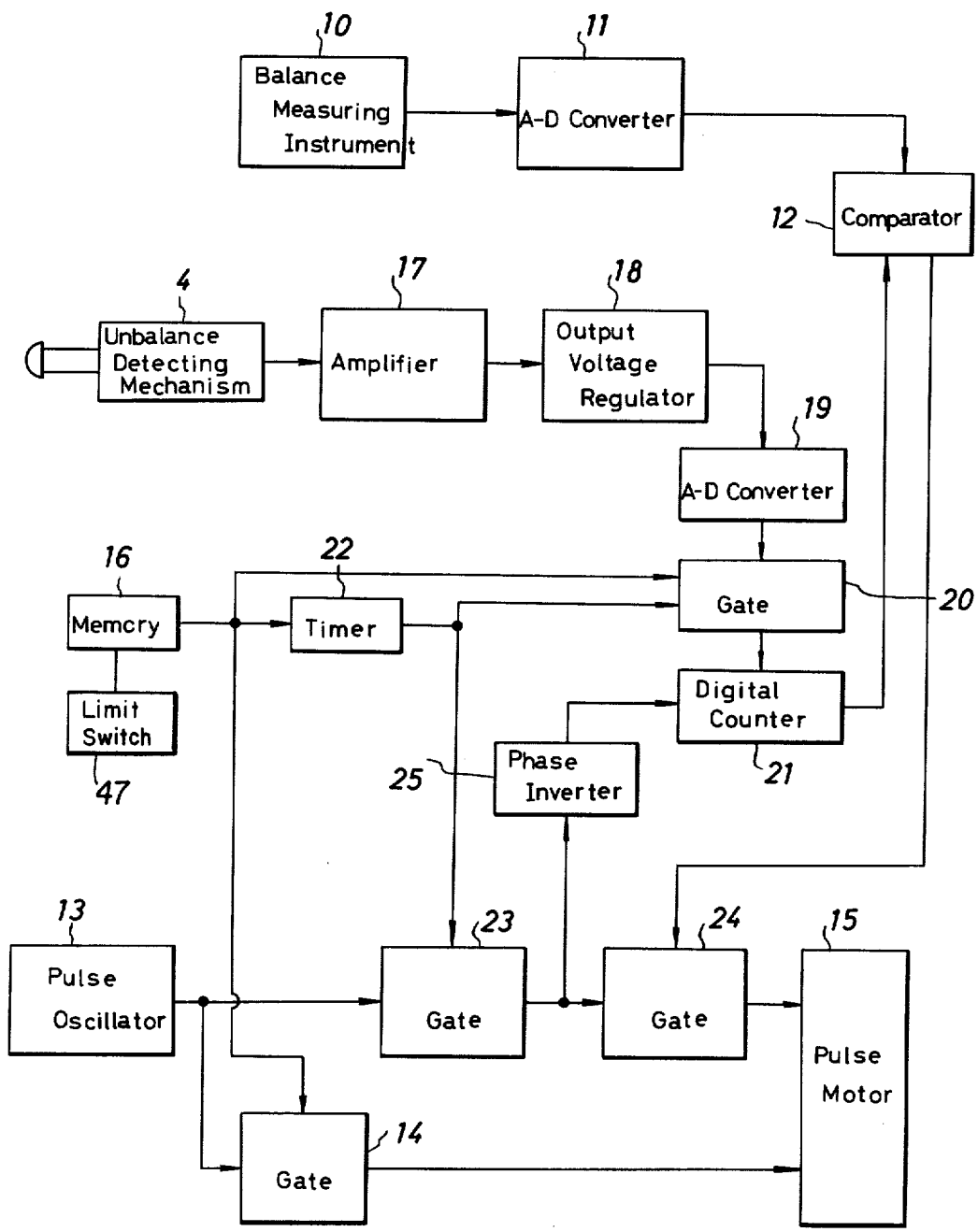
FIG. 2 is a block diagram of the control system for the balance correcting machine according to one embodiment of the present invention.

In FIG. 2, balance measuring instrument 10 is separately provided in order to determine the initial unbalance of workpiece 8 and to transmit an analog output signal corresponding to the magnitude of the unbalance to the remainder of the system via A-D converter 11. As shown in FIG. 4, balance measuring instrument 10 may representatively be an ordinary weighing scale installed separately from the elements of FIG. 1 and being associated thereto only via an autoloader for transporting workpiece 8. A typical balance measuring device is disclosed in Japanese Pat. No. 16079/65 published July 24, 1965. Balance measuring instrument 10 is provided preferably with a pair of differential transformers 36 and 37 respectively associated with balances 34 and 35. The differential transformers are connected to a detecting circuit which produces an output indicative of the difference in movement of the cores of the differential transformers. With the exact desired balance having been predetermined in advance, balance measuring instrument 10 can be advantageously constructed to produce an output signal indicative of the weight difference between the actual state of unbalance and the desired predetermined value of the balance. For purposes of illustration, the instant balance measuring instrument is preset to offer a zero output when balances 34 and 35 are subjected to identical weights.

The output of balance measuring instrument 10 is an analog signal which is converted into a digital signal by A-D converter 11. The digital output signal leaving A-D converter 11 is preset an comparator 12. At this point, workpiece 8 is transported to the balance correcting machine. When this machine is started, pulse oscillator 13 is actuated by the starting command of the balance correcting machine to generate a pulse signal. The pulse signal generated by pulse oscillator 13 is applied to pulse motor 15 through and-gate 14 as the advancing pulse signal for the cutter to actuate pulse motor 15. Pulse motor 15 is actuated to advance cutter slide 1 towards the workpiece 8 in the direction as illustrated with arrow a in FIG. 1. As cutter slide 1 advances, the leading end of detecting head 7 comes into contact with the surface to be corrected (machined) of workpiece 8. As cutter slide 1 further advances, detecting head 7 is pressed against unbalance detecting mechanism 4 against the action of spring 6, and the differential transformer connected to detecting head 7 through connecting rod 5 is actuated to continuously emit an analog output signal. When the leading end of cutter 3 reaches C position, i.e., the correction limit, memory 16, preferably by flip-flop, memorizes the position and thereby simultaneously closes, via a position limit switch (not shown) operating at position C, and-gate 14 to stop pulse motor 15 and in turn cutter slide 1. (Position C is determined in terms of the mechanical cutting ability of the balance correcting machine as well as the limit to which the workpiece can be machined, i.e., the size of the balance correcting allowance portion.)

Figure 7:
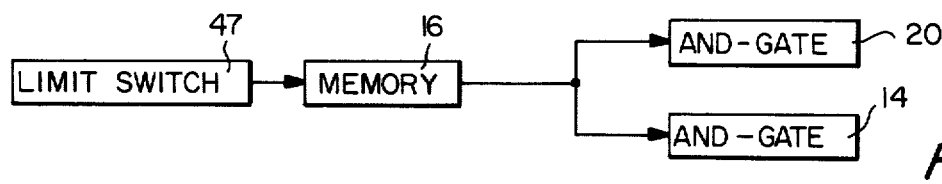
FIG. 7 is a block diagram illustrating the operation of the memory in the present invention.
Figure 8:
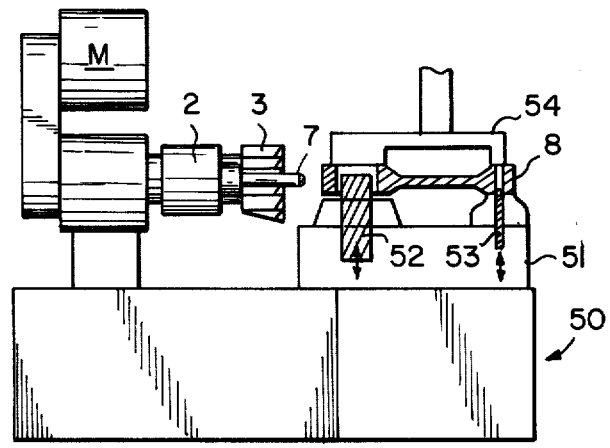
FIGS. 8 and 9 illustrate the operation of the balance measuring instrument in conjunction with the cutter of the present invention.

FIG. 7 shows the function of the memory 16, which may be for example a flip-flop. The output of a limit switch 47 attached to the machine tool generates an output signal at the position of the workpiece 8 at a point C which is the correction limit corresponding to a preset stroke end of the cutter 3 in FIG. 1. This output signal causes a change of state in the flip-flop. Thus, the memory 16 memorizes the position to which the cutter slide 1 advances to the stroke end of the cutter 3 and opens the AND-gate 20 which passes the unbalance output signal from the differential transformer 29 of the unbalance detecting mechanism 4 via A-D converter 19 to preset the digital counter 21. In addition, the memory 16 also functions to close the AND-gate 14 to stop pulse signals to the pulse motor 15 from the pulse oscillator 13 in order to stop the advance of the cutter slide 1 at the point C of the workpiece 8. The output signal generated by the transformer in unbalance detecting mechanism 4 is applied to A-D converter 19 via amplifier 17 and output voltage regulator 18 to convert the analog signal into a digital signal. The purpose of output voltage regulator 18 is to modify the output level of the differential transformer to ensure that the previously determined relationship between the travel of the cutter (quantity of feeding) and the unbalance (weight of the travel portion of the workpiece) correspond to the relationship between the travel of differential transformer 4 and its output, as discussed previously with respect to FIGS. 5a and 5b. This output voltage regulator 18 may be any of the ordinary gas-tube regulator circuit or transistor regulator circuits, such as limiter and clamper for maintaining the output level of the differential transformer of the unbalance detecting mechanism 4. The maximum digital output signal of the differential transformer is preset in digital counter 21 through and-gate 20 opened by memory 16 and closed by timer 22 which simultaneously opens and-gate 23 to pass a pulse signal generated by free-running pulse oscillator 13. Timer 22 is used for fully absorbing the delay time due to the slow response speed of A-D converter 19 when point C is reached. This signal is applied to pulse motor 15 as a retracting signal for cutter 3, and thereby cutter slide 1 begins to retract. Simultaneously, the maximum digital output signal of the differential transformer is substracted pulse by pulse by the retracting signal through phase inverter 25. The reduction ratio of the cutter slide driving mechanism (not shown) is set so that the travel distance of cutter slide 1 per one pulse corresponds to the minimum reference weight of the workpiece in view of the accuracy desired. In this embodiment, the minimum reference weight is set to be 0.1 g. per one pulse, and A–D converter 19 and digital counter 21 are also so constructed that they can respond to the minimum reference weight of 0.1 g. The output voltage of the differential transformer is preset so that, e.g., one mV of it corresponds to one g. of weight (as balance measuring instrument 10 does), on the basis of the resolving power of the differential transformer (available on the market) and the required accuracy of the workpiece. Comparator 12 compares at all times the maximum digital output signal of the differential transformer preset in digital counter 21 as decreased by the retracting signal with the predetermined output signal of the unbalance provided by balance measuring instrument 10. When the value of the output signal preset in digital counter 21 becomes equal to the predetermined value of the unbalance provided by balance measuring instrument 10 as cutter slide 1 retracts, comparator 12 generates a coincidence signal to close and-gate 24, and thereby cuts the retracting signal to stop pulse motor 15. This is position B where cutter 3 is to remove the unbalance of workpiece 8.

In the above-mentioned embodiment, cutter slide 1 advances once to the stroke end and this position (position C) is preset in digital counter 21 as the travel distance of the differential transformer. Then the unbalance generated by digital counter 21 and the predetermined unbalance generated by balance measuring instrument 10 are compared with each other. This procedure is necessary for preventing an inaccurate correcting position due to the lag of response time when A–D converters 11 and 19 which are slow in response speed are used. If an A–D converter which is high in response speed is used, digital counter 21 is not necessary, and in addition the procedure in which the cutter 3 mounted on the cutter slide 1 is moved to the stroke end, i.e., C position and then retracted is not necessary. The A–D converter is used for comparing the digital quantities in the comparator. However, if a comparator which can compare analog quantities is used, an analog output signal from the balance measuring instrument can be directly compared with the analog output signal from the differential transformer without using A–D converters.

Figure 6:
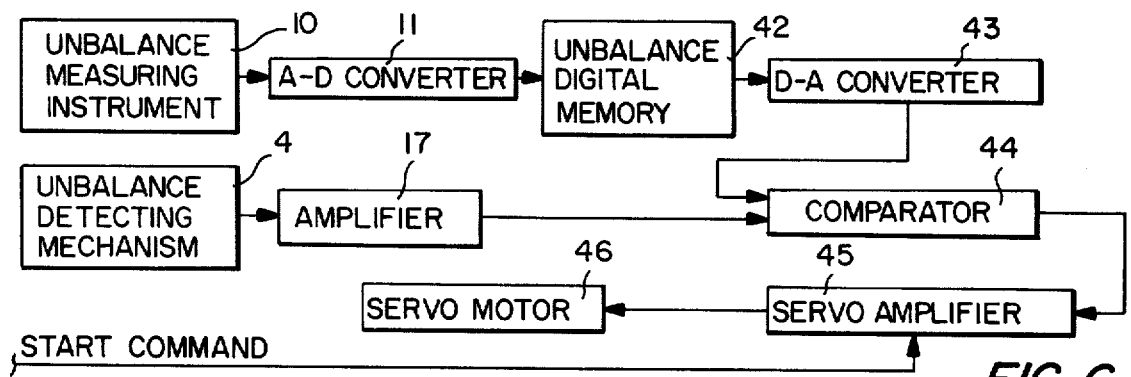
FIG. 6 shows a block diagram of an analog control system for the balance correcting system of the present invention.

Referring to FIG. 6, a block diagram of analog control system for the balance correcting machine of the present invention is shown. An unbalance measuring instrument 10 measures the magnitude of the unbalance of the workpiece 8 in advance, as previously described. Since the measured output from the balance measuring instrument 10 is analog data, the analog output data is converted to digital data by A–D converter 11. The digital output data from the A–D converter 11 is digitally memorized in a digital unbalance memory 42, because the workpiece 8 is removed from the unbalance measuring instrument 10 after the measurement of the unbalance of the workpiece. The workpiece 8 thus measured is carried manually or by a loading device (not shown) to a corrector (not shown), and is clamped by a clamp jig (not shown) to the corrector. Then, the digital unbalance output data from the unbalance memory 42 is applied to a D-A converter 43 which converts the digital unbalance data of the workpiece from the digital unbalance memory 42 to an analog data. The analog unbalance data from the D-A converter 43 is fed to a comparator 44.

Figure 9:
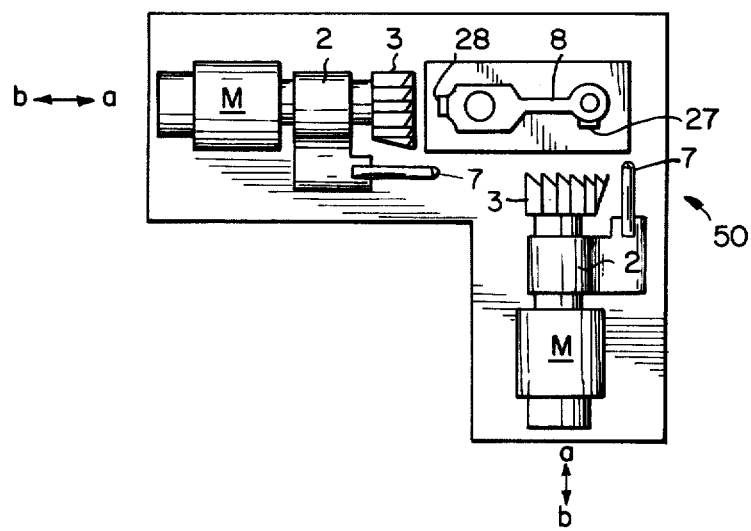

The output of the unbalance detecting mechanism 4 is mounted to the cutter slide 1 as applied to the other input of the comparator 44 via the amplifier 17. The comparator 44 functions to compare the unbalance signal fed from the balance measuring instrument 10 via the A–D converter 1, digital unbalance memory 42, and D–A converter 43 with the output signal generated by the unbalance detecting mechanism 4 via the amplifier 17 to generate a coincidence signal to a servo motor 46 via a servo amplifier 45. The coincidence signal stops the servo motor 46 which is actuated to advance the cutter slide 1 toward the workpiece 8 similar to the pulse motor 15 previously described. More particularly, the servo motor 46 is at first operated by the start command from the corrector (not shown) via the servo amplifier 45. Since the unbalance detecting mechanism 4 is not initially contacting the workpiece 8, the cutter slide 1 is advanced toward the workpiece 8 in the direction as designated 50, it is rested on a platform 51 of the corrector 50 by the loader (not shown) and is positioned by a pair of positioning pins 52 and 53, and the workpiece 8 is fixed to the platform of the corrector 50 by a clamper 54. The workpiece 8 is cut by a pair of cutters 3 controlled by the pulse motor 15 in FIG. 2 and the servo motor 46 in FIG. 6, respectively at the correcting allowance portions 27 and 28 in FIG. 1a in the position relationship as shown in FIG. 9.

It should be understood from the foregoing description that the present invention can correct the unbalance of a workpiece with high accuracy and with ease, without being influenced by the accuracy of the workpiece in the preceding process as in the prior art since the quantity to be corrected is determined with the reference point being set in the workpiece.

We claim:

1. A control system for a balance correcting machine having a laterally advanceable cutter slide with a cutter mounted on a cutter spindle for machining a workpiece, comprising first means associated with the cutter slide for producing a first analog output signal when coming into contact with the to-be-machined surface of the workpiece as the cutter slide advances, said first analog output signal being indicative of the position of the cutter slide relative to said surface, second means for providing a second analog output signal indicative of the predetermined value of the unbalance of the workpiece prior to machining, third means for comparing the first analog output signal with the second analog output signal to produce a control signal, said third means including an amplifier for amplifying said first analog signal, an output voltage regulator for regulating the voltage of the amplified first analog signal, a firs A–D converter for converting the amplified first analog signal into a first digital signal, a first gate for selectively passing the first digital signal therethrough, a digital counter for presetting the first digital signal passed through said first gate, a second A–D converter for converting the second analog signal into a second digital signal, and a comparator for comparing said first digital signal of said first means preset in said digital counter with said second digital signal of said second means to produce a control signal and fourth means for controlling the cutter slide in accordance with the control signal to determine the proper correcting position of the cutter for machining said workpiece to the desired balance.

2. The system as set forth in claim 1, wherein said first means comprises an unbalance detecting mechanism provided in the cutter slide and including a connecting rod which projects from the side of the cutter slide, a detecting head provided at the leading end of said connectng rod biased at all times in the projecting direction by the action of a spring, and a differential transformer for generating an electromotive force having an actuating part connecting in parallel with the cutter spindle to the non-leading end of said connecting rod, the electromotive force of said differential transformer being preset at zero when the leading end of the cutter becomes flush with that of said detecting head and the characteristics of the output gradient being adjusted so that the relationship between the travel of the cutter and the corresponding weight of the workpiece traversed thereby coincides with the relationship between the travel and the output of the transformer.

3. The system as set forth in claim 1, wherein said second means is a balance measuring instrument for providing said third means with the second analog output signal indicative of the value of the unbalance of the workpiece.

4. The system as set forth in claim 1, wherein said fourth means comprises a pulse oscillator for generating a pulse signal according to the starting command of the balance correcting machine, second and third gates for passing a pulse signal of said pulse oscillator, a pulse motor for controlling said cutter slide actuated by a pulse signal passed through said second and third gates, a memory for memorizing a predetermined travel limit of said cutter slide and for closing said second gate thereby stopping said pulse motor, a timer for opening said first gate of said third means thereby passing the first digital signal of said first means to said digital counter and for simultaneously opening said third gate thereby passing a pulse signal to said pulse motor as a retracting signal for retracting said cutter slide, a phase inverter for subtracting pulse by pulse said retracting signal from said first digital signal of said first means preset in said digital counter.

5. The system as set forth in claim 4, wherein said fourth means further comprises a fourth gate for passing the retracting pulse signal from the third gate to said pulse motor, said comparator generating a coincidence signal to close the fourth gate to stop said pulse motor when the value of the pulse-subtracted digital signal in said digital counter becomes equal to said second digital signal.

* * * * *